United States Patent
Vardaro

(10) Patent No.: US 9,288,427 B2
(45) Date of Patent: Mar. 15, 2016

(54) DEVICE FOR DISPLAYING PRODUCTS HAVING A GENERIC SCREEN BASE WITH AN INTERCHANGEABLE TOP DISPLAY

(71) Applicant: INTERNATIONAL VISUAL CORPORATION INC., Montreal (CA)

(72) Inventor: Nicola Vardaro, Montreal (CA)

(73) Assignee: INTERNATIONAL VISUAL CORPORATION INC., Montreal (CA)

( * ) Notice: Subject to any disclaimer, the term of this patent is extended or adjusted under 35 U.S.C. 154(b) by 600 days.

(21) Appl. No.: 13/670,972

(22) Filed: Nov. 7, 2012

(65) Prior Publication Data

US 2013/0114004 A1    May 9, 2013

Related U.S. Application Data

(60) Provisional application No. 61/556,466, filed on Nov. 7, 2011.

(51) Int. Cl.
*H04N 5/64* (2006.01)
*G09F 9/30* (2006.01)
*G09F 5/02* (2006.01)

(52) U.S. Cl.
CPC .. *H04N 5/64* (2013.01); *G09F 5/02* (2013.01); *G09F 9/30* (2013.01)

(58) Field of Classification Search
CPC ............... G09F 5/02; G09F 9/30; H04N 5/64
See application file for complete search history.

(56) References Cited

U.S. PATENT DOCUMENTS

| | | | | |
|---|---|---|---|---|
| 3,602,562 A | * | 8/1971 | Radelfinger | 312/119 |
| 3,881,598 A | * | 5/1975 | Schwimmer | 206/761 |
| 3,937,319 A | * | 2/1976 | Roy | 206/754 |
| 5,547,072 A | * | 8/1996 | Kaiser | 206/765 |
| 5,759,644 A | | 6/1998 | Stanley | |
| 5,979,661 A | * | 11/1999 | Sherman et al. | 206/754 |
| 2005/0202879 A1 | * | 9/2005 | Hussaini et al. | 463/47 |
| 2007/0193096 A1 | * | 8/2007 | Rice | 40/711 |
| 2008/0251396 A1 | * | 10/2008 | Oh | 206/6.1 |
| 2009/0065374 A1 | * | 3/2009 | Au | 206/6.1 |

FOREIGN PATENT DOCUMENTS

| | | |
|---|---|---|
| GB | 2384754 A | 8/2003 |
| GB | 2387355 A | 10/2003 |
| GB | 2464828 A | 5/2010 |
| WO | 03009586 A1 | 1/2003 |

* cited by examiner

*Primary Examiner* — Sath V Perungavoor
*Assistant Examiner* — Peter D Le
(74) *Attorney, Agent, or Firm* — Goudreau Gage Dubuc; Gonzalo Lavin

(57) ABSTRACT

A device for displaying products includes a monitor screen for displaying images with a perpendicular base and a display member configured to be detachably mounted on the monitor screen and base. The display member includes a frame having an aperture sized to match a screen of the monitor screen; and a support member substantially perpendicular to the frame for supporting the products.

1 Claim, 7 Drawing Sheets

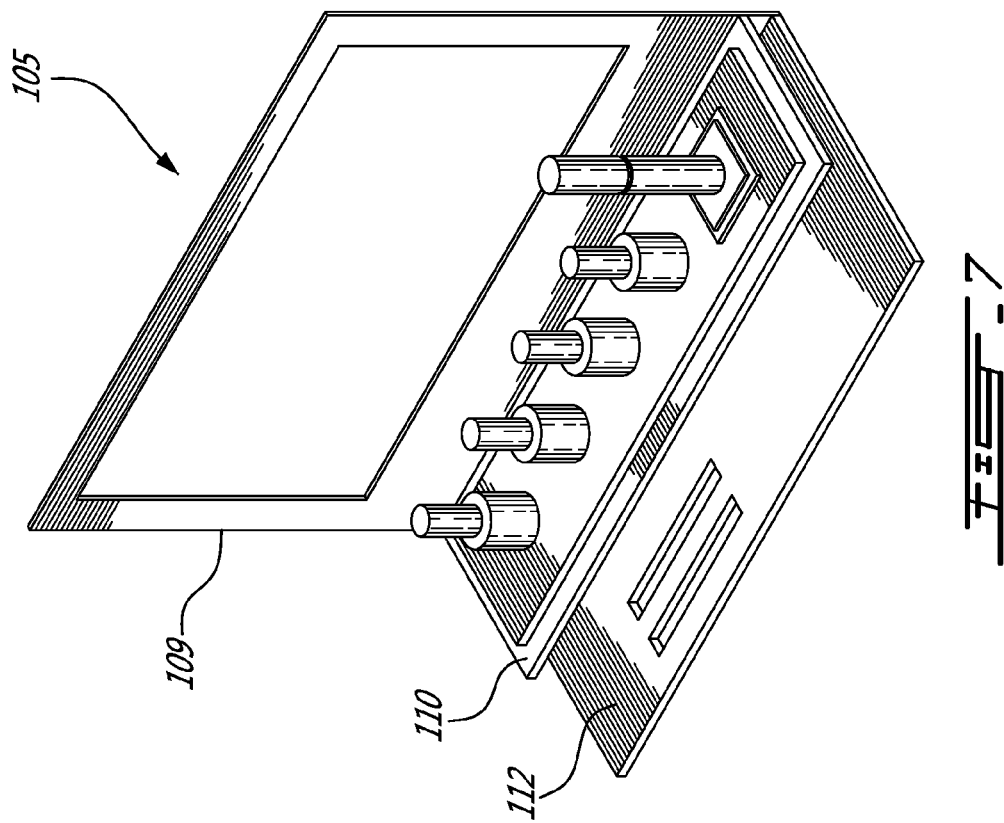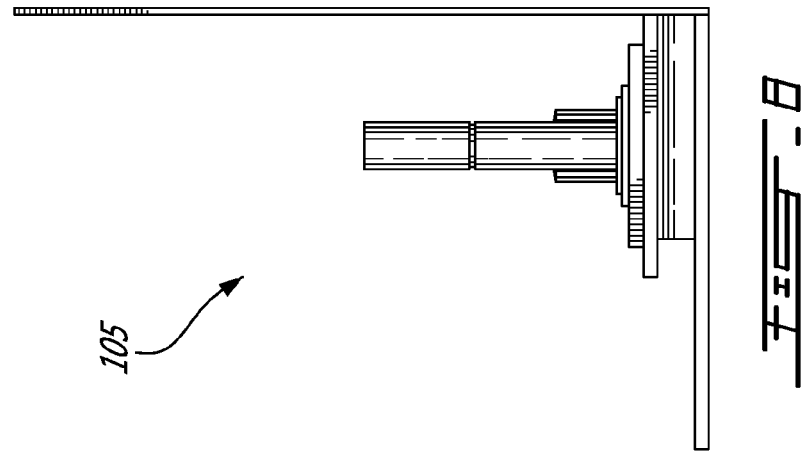

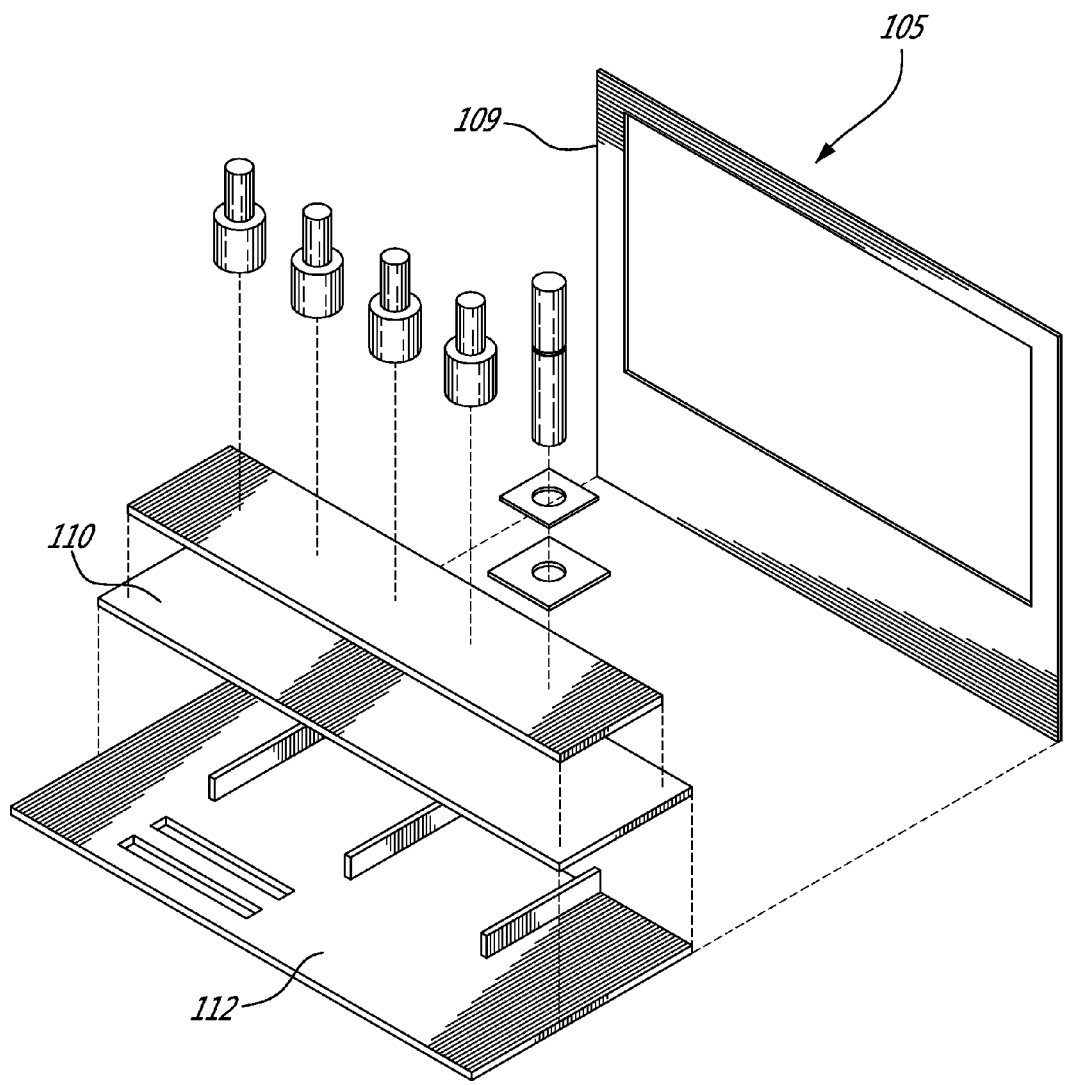

DEVICE FOR DISPLAYING PRODUCTS HAVING A GENERIC SCREEN BASE WITH AN INTERCHANGEABLE TOP DISPLAY

CROSS REFERENCE TO RELATED APPLICATIONS

This application claims benefit, under 35 U.S.C. §119(e), of U.S. provisional application Ser. No. 61/556,466, filed on Nov. 7, 2011, which is incorporated herein in its entirety by reference.

FIELD OF THE INVENTION

The present invention relates to a display screen of an electronic device. More specifically, the present invention is concerned with interchangeable cover for the display screen of an electronic device.

BACKGROUND OF THE INVENTION

Known in the art, there are interchangeable computer monitor frame covers used for decorative or protective purposes. However, these typically cover the rectangular frame of the monitor and are not used for purposes other than decoration and/or protection.

In the field of cosmetics, products are promoted by being positioned adjacent monitor screens that show videos about said products. However, there is no close integration between such screen and said products. The same is applicable for products in other fields, such as pharmaceutical products, accessorial products, retail products, or the like. There is therefore a need in the market for a solution that closely integrates vendible products with those shown on a video screen.

SUMMARY OF THE INVENTION

More specifically, in accordance with the present invention, there is provided device for displaying products, comprising: a monitor screen member for displaying images; and a display member detachably mounted on the monitor screen member, wherein the display member includes a support member for receiving said products.

Preferably, the display member is detachably mounted to the monitor screen member via at least one magnet. Other means for attaching the display member to the monitor screen may be provided and may include hooks, Velcro™, snaps, or the like.

Preferably, the monitor screen member includes a base member extending substantially perpendicularly from the monitor screen member, said base member being configured to support said products.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 is a perspective view of the interchangeable top display shown in FIG. 1;

FIG. 8 is a side view of the interchangeable top display shown in FIG. 7;

FIG. 11 is an exploded perspective view of the interchangeable top display shown in FIG. 7.

DESCRIPTION OF ILLUSTRATIVE EMBODIMENTS

The present invention is illustrated in further details by the following non-limiting examples.

Figure 1:
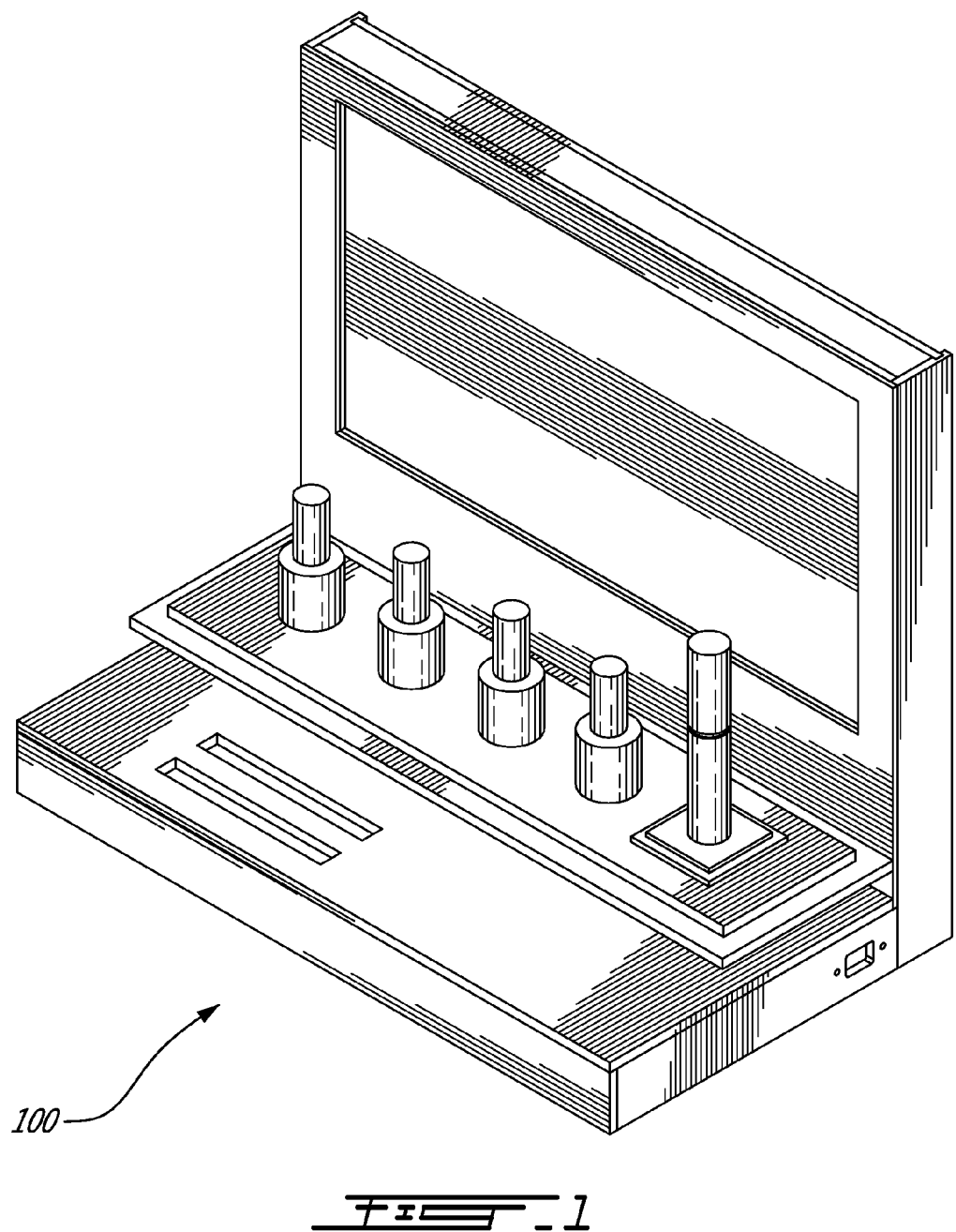
FIG. 1 is a perspective view of a device for displaying products having a generic screen base with an interchangeable top display, according to a preferred embodiment of the present invention.
Figure 2:
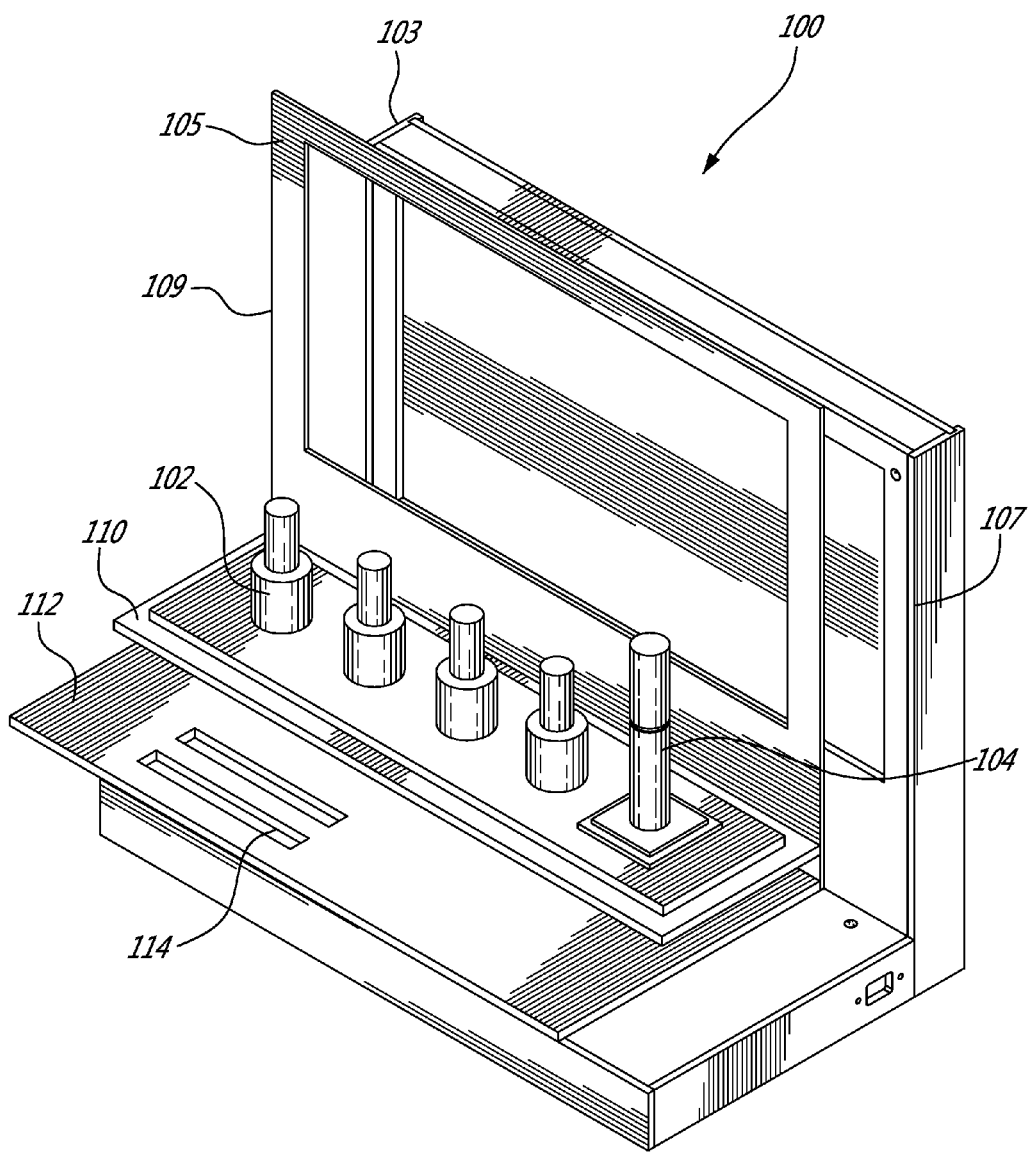
FIG. 2 is a perspective view of the device shown in FIG. 1, with the interchangeable top display being partly removed from the generic screen base.
Figure 3:
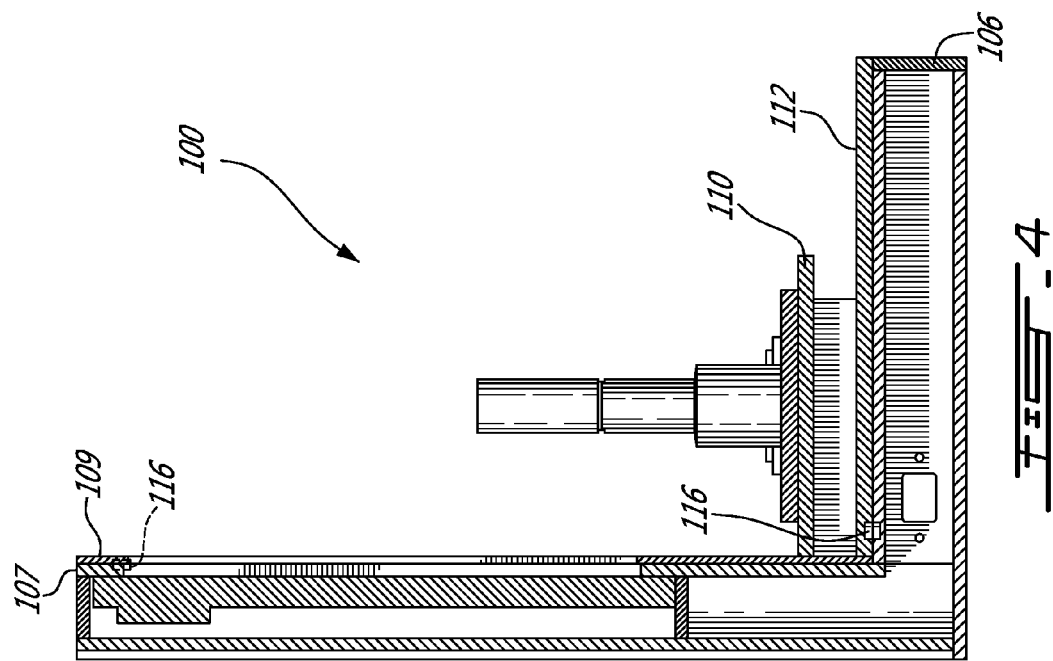
FIG. 3 is a front view of the device shown in FIG. 1.

Referring to FIGS. 1 to 3, there is shown a device 100 for displaying products, such as cosmetic nail polish bottles 102 and a make-up stick 104, or the like, according to a preferred embodiment of the present invention. The device 100 includes a monitor screen member 103 for displaying images, which includes a generic base 106 that is generally horizontal and a monitor screen 107 that is generally vertical. The angle between the base 106 and the monitor screen 107 may be varied and these could be foldable with respect to each other. The base 106 preferably does not have a keyboard and is flat. The device 100 also includes a separate top display member 105 configured to be detachably mounted on the monitor screen member 103. The top display member 105 includes a top rectangular frame 109 having a rectangular aperture matching with the screen member 103. The display member 105 includes a support member 110 for receiving the products 102, 104. The support member 110 may be a rectangular plate that is perpendicularly connected to the rectangular frame 109. A second support member 112 is located below and parallel to the first support member 110 and extends further away from the rectangular frame 109 than the first support member 110. The second support member may include a set of grooves 114 for receiving products, such as the make-up stick 104. Persons skilled in the art will understand that the device according to the present invention may be modified to receive other vendible products, such as watches or any other item that can be supported by the support members 110 and/or 112.

Figure 4:
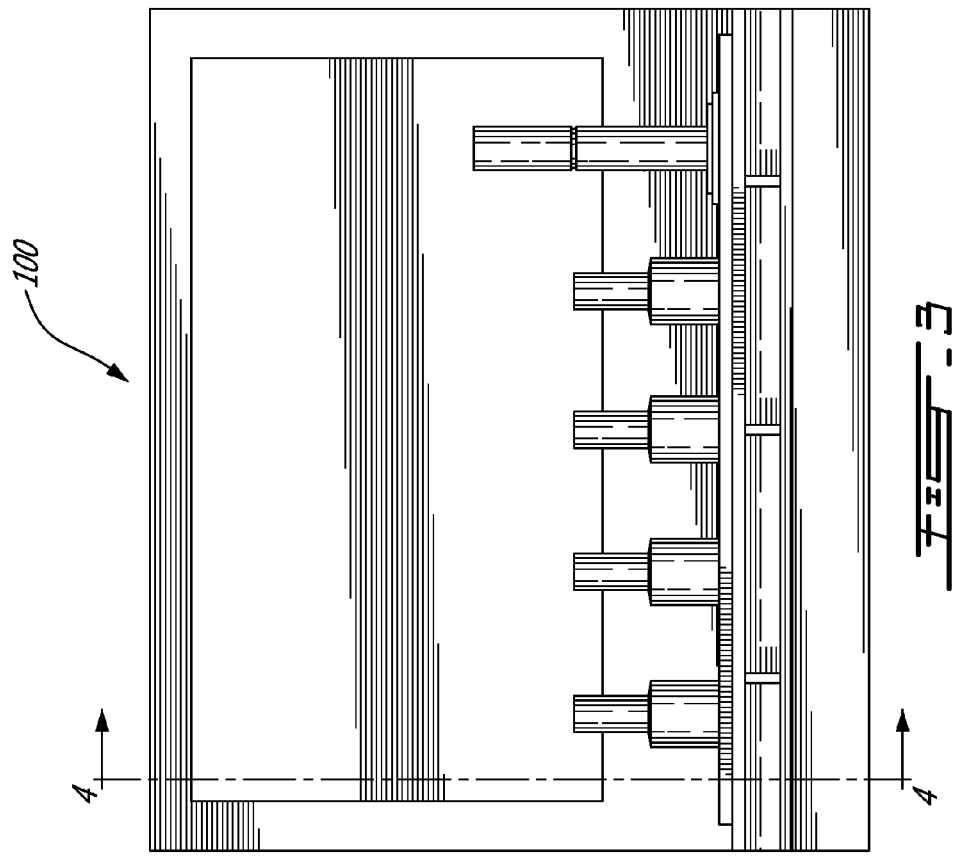
FIG. 4 is a side cross-view of the device of FIG. 3 taken along line 4-4.

Referring to FIG. 4, in addition to FIGS. 1 to 3, there are shown a pair of magnets 116 that are used to connect the top display 105 to the monitor screen member 103. One magnet 116 is located between the monitor screen 107 and the rectangular frame 109. Another magnet is located between the second support member 112 and the base 106. The magnets 116 could be positioned in other locations for the same purpose of detachably connecting the monitor screen member 103 to the display member 105. Other means of releasably attaching the screen member 103 to the display member 103 may include hooks, snaps, Velcro™ or the like.

Figure 6:
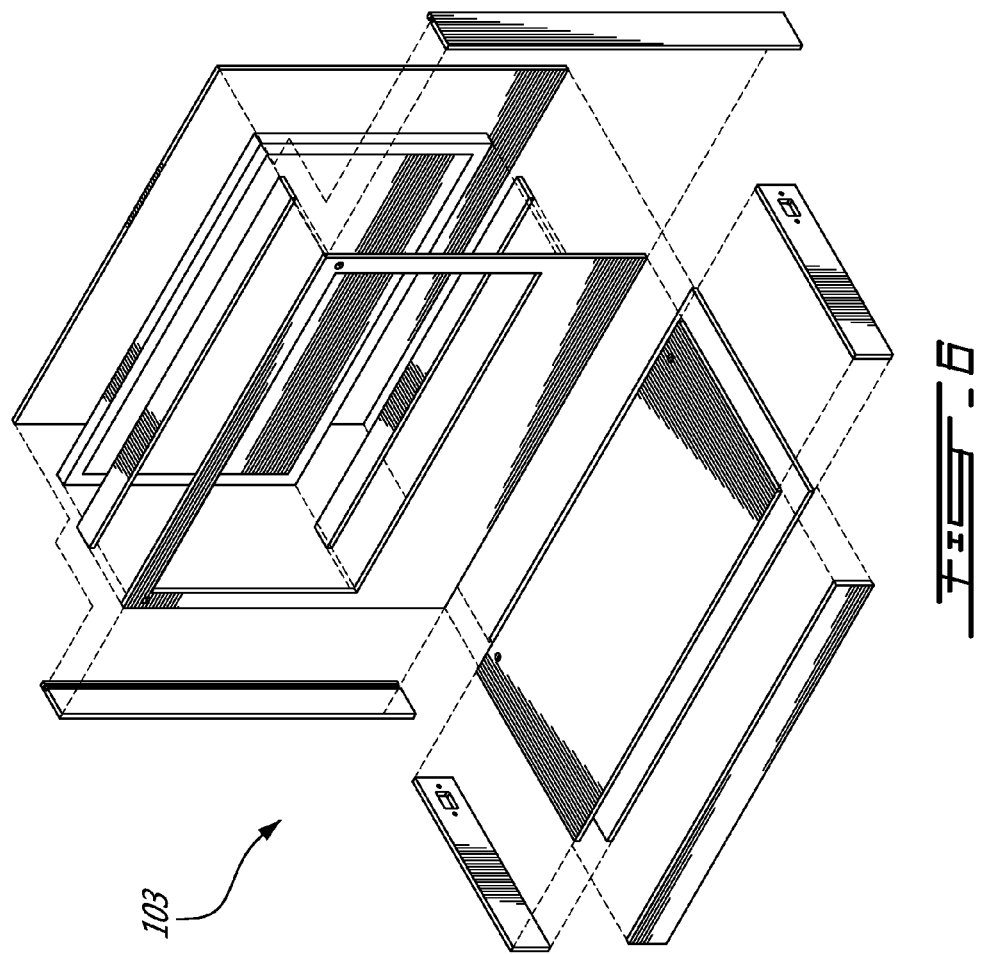
FIG. 6 is an exploded view of the generic screen base shown in FIG. 5.
Figure 5:
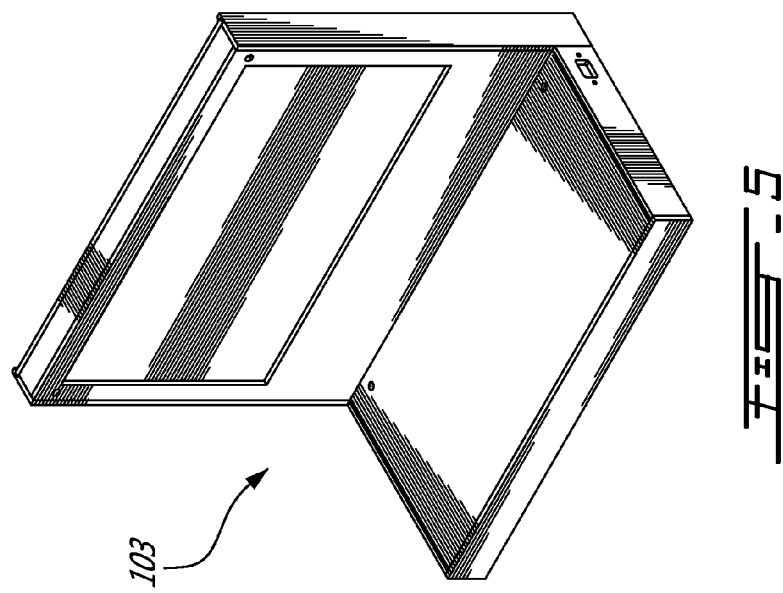
FIG. 5 is a perspective view of the generic screen base shown in FIG. 1.
Figure 9:
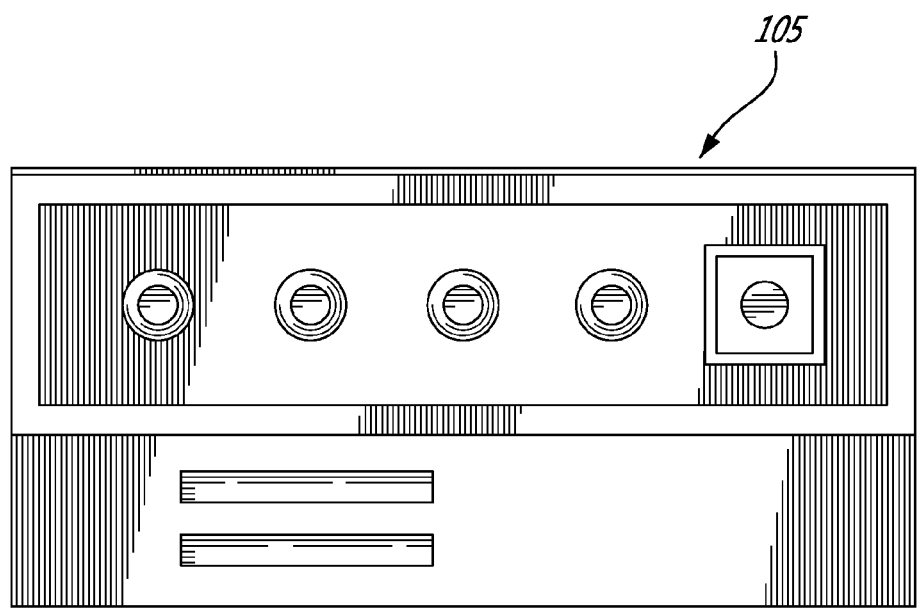
FIG. 9 is a top view of the interchangeable top display shown in FIG. 7.
Figure 10:
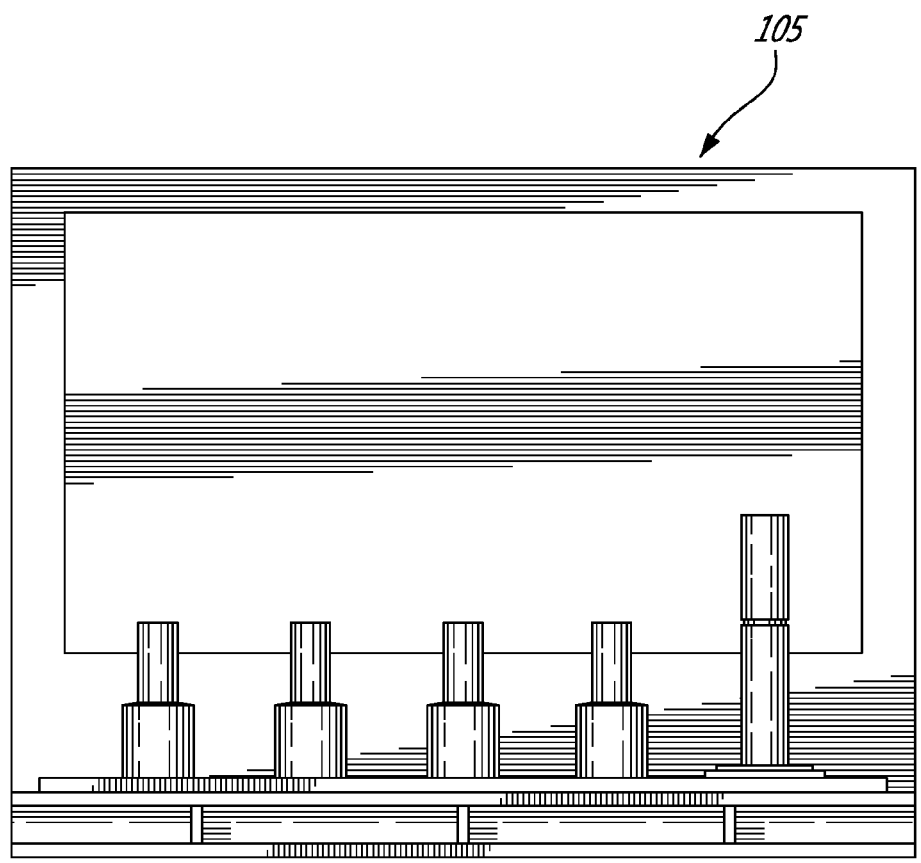
FIG. 10 is a front view of the interchangeable top display shown in FIG. 7.

Referring to FIGS. 5 and 6, there is shown a more detailed view of the monitor screen member 103 that includes the generic base 106 and the monitor screen 107. The monitor screen member 103 may include an LCD screen, electronic components (not shown) and a USB port 12, or any other input port, for connecting the screen member to an external computer that provides the video images. The monitor screen member 103 may be provided with minimum functionality to diminish costs or could integrate its own micro-computer for expanded functionality.

In use, the monitor screen member 103 displays information about the products 102, 104 that are positioned on top of the support members 110, 112. The monitor screen member may include at least a speaker to provide audio information about the products.

Referring to FIGS. 7 to 11, there is shown a more detailed view of the top display member 105 that includes the rectangular frame 109, the first support member 110 and the second support member 112. The top display member 105 may be made of different colors or decorative patterns so that the top display member 105 could be easily replaced with another one.

Although the present invention has been described hereinabove by way of specific embodiments thereof, it can be modified, without departing from the spirit and nature of the subject invention as defined in the appended claims.

The invention claimed is:

1. A display device kit for receiving products thereon, the display device kit being mountable on a monitor screen member, said monitor screen member having a base member extending substantially perpendicularly from the monitor screen member, the display device kit comprising:
   a first frame having an aperture sized to match a screen of the monitor screen member;
   a first support member connected to the first frame and substantially perpendicular to the first frame for supporting said products;
   wherein the first frame and first support member define a first display device that is magnetically detachable from the monitor screen member, the first display device having a first decorative pattern or first color;
   a second frame having an aperture sized to match the screen of the monitor screen member;
   a second support member connected to the second frame and substantially perpendicular to the second frame for supporting said products;
   wherein the second frame and second support member define a second display device that is magnetically detachable from the monitor screen member, the second display device having a second decorative pattern or a second color, wherein the first display device is interchangeable with the second display device on the base member and monitor screen member, and wherein when the first display device is interchanged with the second display device the first frame remains connected to the first support member and the second frame remains connected to the second support member.

\* \* \* \* \*